US008775061B2

(12) United States Patent
Sato

(10) Patent No.: US 8,775,061 B2
(45) Date of Patent: Jul. 8, 2014

(54) VEHICLE CONTROL DEVICE

(75) Inventor: Kunihito Sato, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 495 days.

(21) Appl. No.: 13/132,175

(22) PCT Filed: Jan. 19, 2009

(86) PCT No.: PCT/JP2009/050670
§ 371 (c)(1),
(2), (4) Date: Jun. 1, 2011

(87) PCT Pub. No.: WO2010/082353
PCT Pub. Date: Jul. 22, 2010

(65) Prior Publication Data
US 2012/0004835 A1 Jan. 5, 2012

(51) Int. Cl.
*G08G 1/09* (2006.01)
*G08G 1/16* (2006.01)
*G08G 1/01* (2006.01)

(52) U.S. Cl.
CPC ............... *G08G 1/0104* (2013.01); *G08G 1/16* (2013.01); *G08G 1/167* (2013.01)
USPC .............. 701/118; 701/96; 701/119; 340/934

(58) Field of Classification Search
CPC ......... G08G 1/0104; G08G 1/16; G08G 1/10; G08G 1/161; G08G 1/08; G08G 1/096791; G08G 1/22; G08G 1/0145
USPC ............ 701/96, 117, 118, 119, 301; 340/933, 340/934
See application file for complete search history.

(56) References Cited

U.S. PATENT DOCUMENTS 6,708,085 B2 * 3/2004 Yamane et al. .................... 701/1
7,016,783 B2 * 3/2006 Hac et al. ...................... 701/301
(Continued)

FOREIGN PATENT DOCUMENTS

JP A-10-307997 11/1998
JP A-2002-334393 11/2002
(Continued)

OTHER PUBLICATIONS

International Search Report issued in International Application No. PCT/JP2009/050670 on Feb. 10, 2009 (with translation).

*Primary Examiner* — Thomas G Black
*Assistant Examiner* — Peter D Nolan
(74) *Attorney, Agent, or Firm* — Oliff PLC

(57) ABSTRACT

A vehicle control device includes: a road-to-vehicle communication device which acquires information regarding the volume of traffic in a predetermined section on a road where a vehicle travels and which transmits the traffic volume information to a determination section; a deceleration acquisition section which acquires deceleration of a vehicle in front in the predetermined section and transmits information regarding the deceleration to the determination section; the determination section which determines whether or not a lane change is necessary on the basis of the traffic volume information acquired by the road-to-vehicle communication device and the deceleration acquired by the deceleration acquisition section; and an instruction section which instructs at least either the host vehicle or a vehicle behind to change lane when the determination section determines that a lane change is necessary. Therefore, it is possible to provide a vehicle control device capable of suppressing the occurrence of a traffic jam.

8 Claims, 3 Drawing Sheets

(56) References Cited

U.S. PATENT DOCUMENTS

| | | | | |
|---|---|---|---|---|
| 7,443,284 | B2* | 10/2008 | Curtis | 340/425.5 |
| 7,821,381 | B2* | 10/2010 | Curtis | 340/425.5 |
| 8,060,300 | B2* | 11/2011 | Nagase et al. | 701/414 |
| 8,355,852 | B2* | 1/2013 | Grimm et al. | 701/96 |
| 2007/0005231 | A1* | 1/2007 | Seguchi | 701/117 |
| 2007/0038361 | A1* | 2/2007 | Yavitz et al. | 701/117 |
| 2007/0135989 | A1* | 6/2007 | Hengst | 701/117 |
| 2008/0275635 | A1 | 11/2008 | Jung | |
| 2008/0291051 | A1* | 11/2008 | Hyslop | 340/902 |
| 2009/0192666 | A1* | 7/2009 | Trippler | 701/29 |

FOREIGN PATENT DOCUMENTS

| | | |
|---|---|---|
| JP | A-2005-266844 | 9/2005 |
| JP | A-2006-309735 | 11/2006 |
| JP | A-2006-309736 | 11/2006 |

* cited by examiner

VEHICLE CONTROL DEVICE

TECHNICAL FIELD

The present invention relates to a vehicle control device which performs control for suppressing the occurrence of a traffic jam for a vehicle.

BACKGROUND ART

As a conventional vehicle control device in the above-described technical field, for example, a technique disclosed in Patent Literature 1 is known. The traffic jam easing device disclosed in Patent Literature 1 creates traffic jam easing information from the average volume of traffic and the average speed in a first section and provides the traffic jam easing information to a vehicle traveling in a second section located at the downstream side from the first section.
Patent Literature 1: Japanese Unexamined Patent Application Publication No. 2006-309735

SUMMARY OF INVENTION

Technical Problem

In the traffic jam easing device disclosed in Patent Literature 1 described above, the traffic jam easing information is information created on the basis of the average speed of a plurality of vehicles traveling in a predetermined section and is not information regarding the speed of a specific vehicle. For this reason, in the traffic jam easing device described in Patent Literature 1, it is difficult to suppress a traffic jam occurring when the deceleration of a predetermined vehicle affects vehicles behind.

Therefore, the present invention has been made in view of such a situation, and it is an object of the present invention to provide a vehicle control device capable of efficiently suppressing the occurrence of a traffic jam.

Solution to Problem

In order to achieve the above-described object, a vehicle control device related to the present invention is characterized in that it includes: traffic volume information acquisition means for acquiring traffic volume information in a predetermined section on a road where a vehicle travels; deceleration acquisition means for acquiring deceleration of a vehicle in front in the predetermined section; determination means for determining whether or not a lane change is necessary on the basis of the traffic volume information acquired by the traffic volume information acquisition means and the deceleration acquired by the deceleration acquisition means; and instruction means for instructing the vehicle to chancre lane when the determination means determines that the deceleration is equal to or larger than a first redetermined value and a lane change is necessary and instructing the vehicle and the vehicle behind to change lane when the determination means determines that the deceleration is equal to or larger than a second predetermined value, which is larger than the first predetermined value, and a lane change is necessary.

In this vehicle control device, not only the traffic volume information in the predetermined section but also the deceleration of a vehicle in front is acquired to give an instruction of lane change. Accordingly, since it is possible to suppress the influence of deceleration of a vehicle in front on a vehicle behind, the occurrence of a traffic jam can be efficiently suppressed.

In addition, in the vehicle control device related to the present invention, it is preferable that the instruction means instructs the vehicle to change lane when the determination means determines that the deceleration is equal to or larger than a first predetermined value and a lane change is necessary. In addition, it is preferable that the instruction means instructs the vehicle and the vehicle behind to change lane when the determination means determines that the deceleration is equal to or larger than a second predetermined value, which is larger than the first predetermined value, and a lane change is necessary. In these cases, an instruction of lane change is given only to the host vehicle when the deceleration of a vehicle in front is relatively small, and an instruction of lane change is given not only to the host vehicle but also to a vehicle behind is given when the deceleration of a vehicle in front is relatively large. Accordingly, the occurrence of a traffic jam can be suppressed more efficiently.

In addition, in the vehicle control device related to the present invention, it is preferable that the traffic volume information is a vehicle traffic volume per unit time in the predetermined section and the determination means determines that a lane change is necessary when the vehicle traffic volume per unit time is equal to or larger than a predetermined value. In this case, the determination means can easily determine whether or not a lane change is necessary on the basis of the vehicle traffic volume per unit time.

In addition, in the vehicle control device related to the present invention, it is preferable that when the determination means determines that a lane change is necessary, the instruction means instructs the vehicle to change lane if there is a space for lane change in an adjacent lane. In this case, since the instruction means instructs a lane change when the lane change is necessary and is possible, the occurrence of a traffic jam can be suppressed more efficiently.

In addition, in the vehicle control means related to the present invention, it is preferable that when instructing the vehicle behind to change lane, the instruction means instructs the vehicle behind, in which a vehicle-to-vehicle communication device is mounted, to change lane through vehicle-to-vehicle communication. In this case, the instruction means can reliably instruct a vehicle behind to change lane through vehicle-to-vehicle communication.

Advantageous Effects of Invention

According to the present invention, it is possible to provide a vehicle control device capable of efficiently suppressing the occurrence of a traffic jam.

REFERENCE SIGNS LIST

Figure 1:
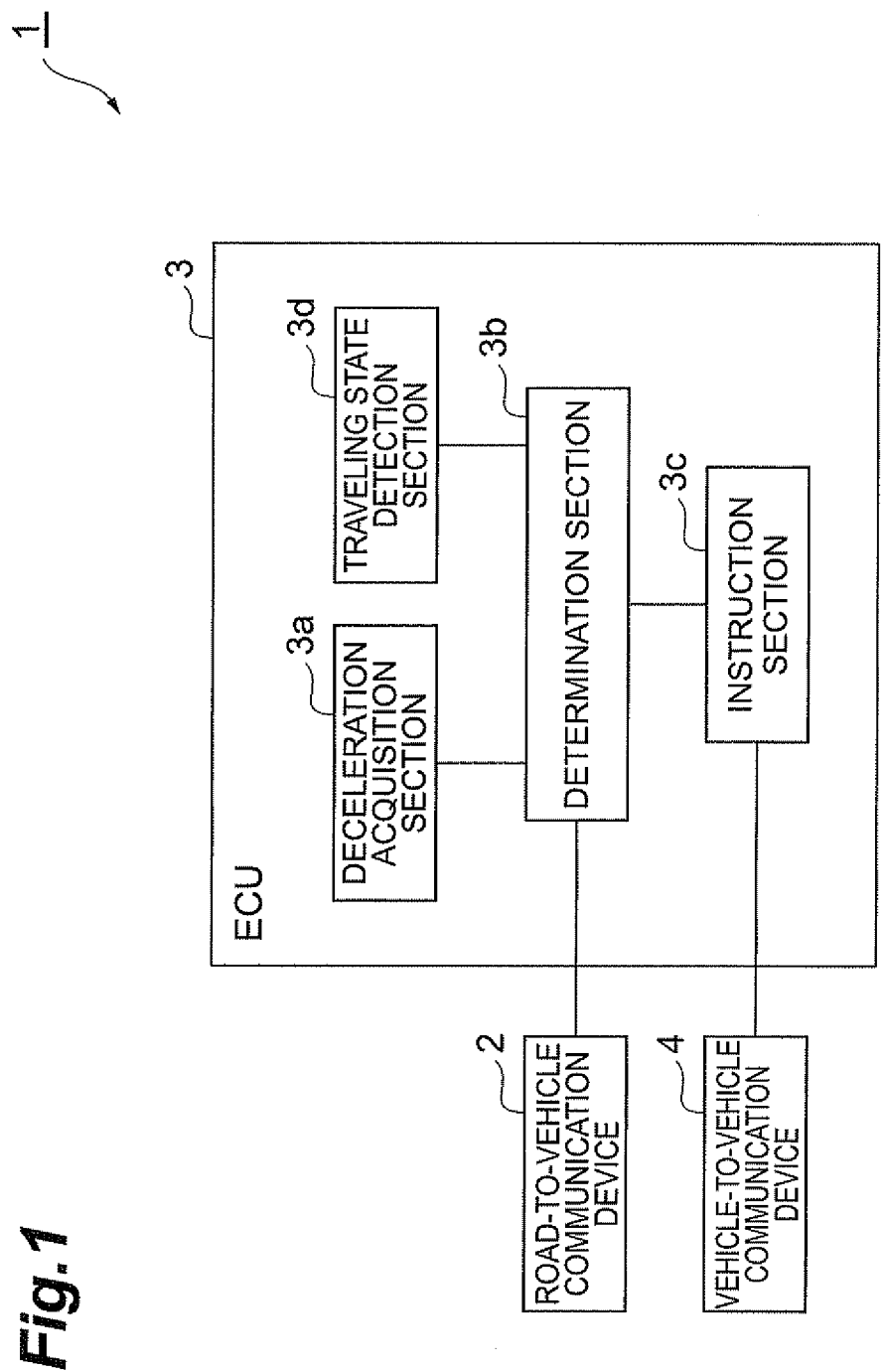
FIG. 1 is a block diagram showing the configuration of an embodiment of a vehicle control device related to the present invention.

1: vehicle control device
2: road-to-vehicle communication device (traffic volume information acquisition means)
3: ECU
3*a*: deceleration acquisition section (deceleration acquisition means)

3b: determination section (determination means)
3c: instruction section (instruction means)
3d: traveling state detection section
4: vehicle-to-vehicle communication device (instruction means)

DESCRIPTION OF EMBODIMENTS

Hereinafter, preferred embodiments of the present invention will be described with reference to the drawings. In addition, in each drawing, the same or corresponding sections are denoted by the same reference numerals and repeated explanation thereof will be omitted.

FIG. 1 is a block diagram showing the configuration of an embodiment of a vehicle control device related to the present invention. As shown in FIG. 1, a vehicle control device 1 includes a road-to-vehicle communication device (traffic volume information acquisition means) 2, an ECU (Electronic Control Unit) 3, and a vehicle-to-vehicle communication device (instruction means) 4. In addition, the ECU 3 includes a deceleration acquisition section (deceleration acquisition means) 3a, a determination section (determination means) 3b, an instruction section (instruction means) 3c, and a traveling state detection section 3d. In addition, in the present embodiment, the vehicle control device 1 is mounted in a host vehicle.

The road-to-vehicle communication device 2 is a receiver for receiving the information from a transmitter, such as a traffic counter installed on the road. The road-to-vehicle communication device 2 receives and acquires from a transmitter, such as a traffic counter installed on the road, the traffic volume information in a predetermined section on the road where the host vehicle travels. In addition, the road-to-vehicle communication device 2 transmits the traffic volume information to the determination section 3b of the ECU 3. The traffic volume information is information regarding the vehicle traffic volume per unit time in the predetermined section, for example.

The ECU 3 is configured to include an operational device such as a CPU, storage devices such as a ROM and a RAM, a communication module, and various sensors which are not shown in the drawing. These work together to realize the functions of the deceleration acquisition section 3a, the determination section 3b, the instruction section 3c, and the traveling state detection section 3d.

The deceleration acquisition section 3a includes an inter-vehicle distance sensor or the like and detects the deceleration (acceleration) of a vehicle in front by measuring an inter-vehicle distance between a host vehicle and a vehicle in front sequentially. Thus, the deceleration acquisition section 3a detects and acquires the deceleration of a vehicle in front with respect to the host vehicle in the predetermined section and transmits the information regarding the deceleration to the determination section 3b.

The determination section 3b determines whether or not a lane change is necessary for the host vehicle and a vehicle behind on the basis of the traffic volume information acquired by the road-to-vehicle communication device 2 and the information regarding the deceleration of the vehicle in front acquired by the deceleration acquisition section 3a and transmits a signal indicating the determination result to the instruction section 3c. Specifically, first, the determination section 3b detects a state immediately before a traffic jam on the basis of the traffic volume information from the road-to-vehicle communication device 2. Here, the state immediately before a traffic jam is detected when the vehicle traffic volume per unit time in the predetermined section is equal to or larger than a predetermined value. Then, when a state immediately before a traffic jam is detected, the determination section 3b determines that a lane change is necessary for the host vehicle when the deceleration of the vehicle in front is equal to or larger than a first predetermined value and transmits a signal indicating the determination result to the instruction section 3c. In addition, when a state immediately before a traffic jam is detected, the determination section 3b determines that a lane change is necessary for the host vehicle and a vehicle behind if the deceleration of the vehicle in front is equal to or larger than a second predetermined value, which is larger than the first predetermined value, and transmits a signal indicating the determination result to the instruction section 3c.

In addition, when a transmitter, such as a traffic counter, is not installed on the road where the host vehicle travels, the determination section 3b detects a state immediately before a traffic jam on the basis of the traveling state information transmitted from the traveling state detection section 3d. The traveling state detection section 3d measures the average speed of the host vehicle at predetermined time intervals and measures the average inter-vehicle distance at the predetermined time intervals and transmits the information (traveling state information) regarding these measured values to the determination section 3b. The determination section 3b detects a state immediately before a traffic jam when these measured values are equal to or smaller than respective predetermined values.

The instruction section 3c instructs the host vehicle to change lane when the signal transmitted from the determination section 3b is a signal indicating that the lane change is necessary for the host vehicle. In addition, when the signal transmitted from the determination section 3b is a signal indicating that the lane change is also necessary for a vehicle behind, the instruction section 3c instructs the host vehicle to change lane and also transmits to the vehicle-to-vehicle communication device 4 a signal for instructing the vehicle behind to change lane. When the instruction section 3c receives from the determination section 3b a signal indicating that the host vehicle needs to change lane, the instruction section 3c instructs the host vehicle to change lane if there is a space, which allows the host vehicle to change lane, in a lane adjacent to the lane along which the host vehicle is traveling.

The vehicle-to-vehicle communication device 4 is a transceiver for transmission and reception of the information between vehicles. The vehicle-to-vehicle communication device 4 receives the signal instructing the vehicle behind to change lane, which is transmitted from the instruction section 3c, and instructs the vehicle behind, in which a vehicle-to-vehicle communication device is mounted, to change lane through vehicle-to-vehicle communication.

Figure 2:
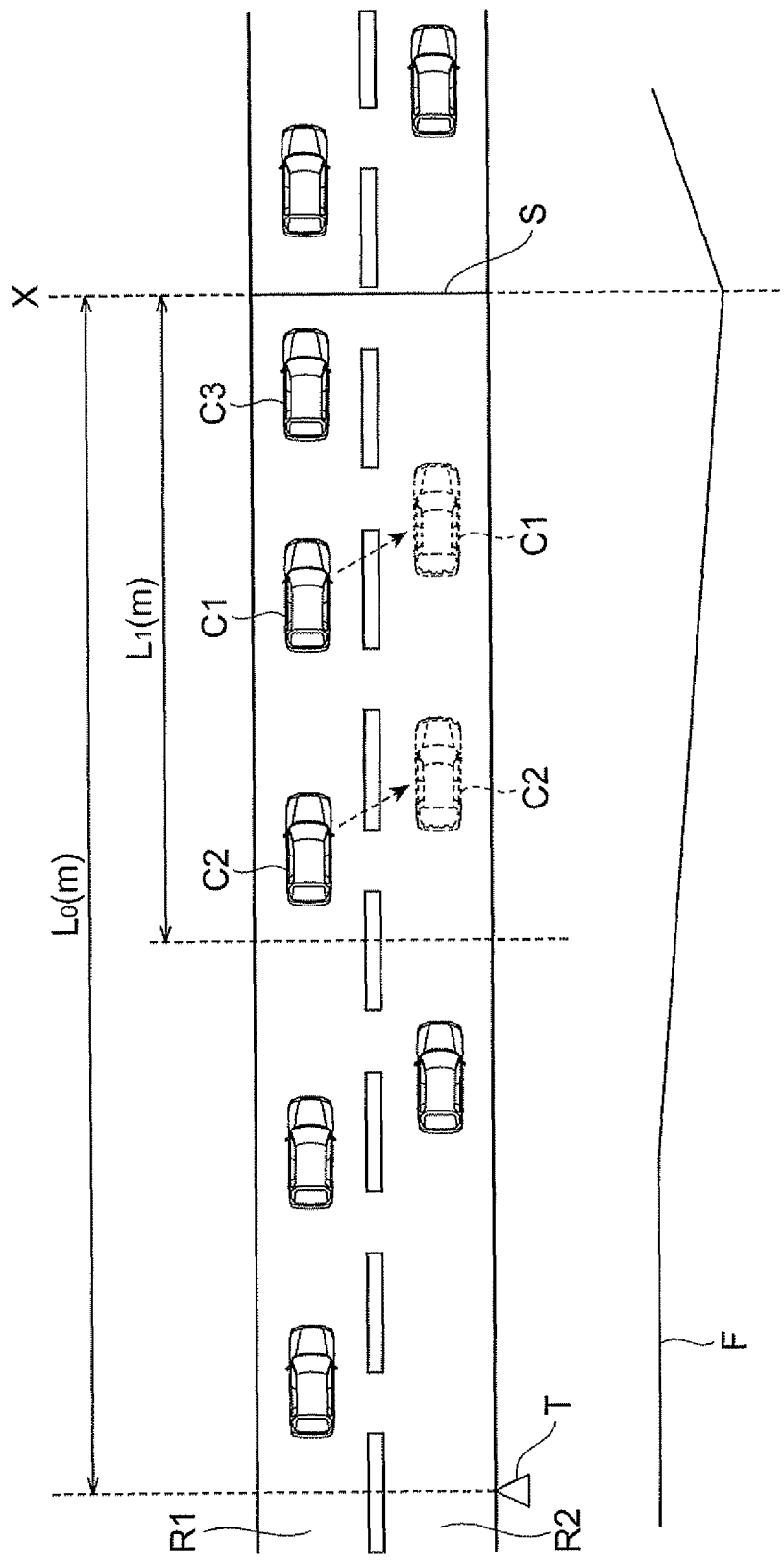
FIG. 2 is a view for explaining an example of use of the vehicle control device shown in FIG. 1.

Next, an example of use of the vehicle control device 1 will be described using FIGS. 2 and 3. FIG. 2 is a view for describing an example of use of the vehicle control device 1. A straight line F in FIG. 2 schematically shows the slope of lanes 1 and 2. As shown in FIG. 2, a host vehicle C1 in which the vehicle control device 1 is mounted is traveling in a lane R1. The lane R1 is a passing lane and the lane R2 is a driving lane adjacent to the lane R1. The lanes R1 and R2 have a sagging portion S at the position X. Here, the sagging portion S is a point of change from a downward slope to an upward slope toward the traveling direction of the host vehicle C1, as indicated by the straight line F in FIG. 2. A vehicle traveling through such a sagging portion S tends to decelerate. For this reason, in the sagging portion S, it is thought that a traffic jam easily occurs due to the influence of the deceleration of a vehicle in front on a vehicle behind. A traffic counter T is installed on the roadside of the lane R2. The traffic counter T counts the number of vehicles, which pass through the point located $L_0$m (for example, about 2000 m) before the sagging portion 5, per unit time in the lanes R1 and R2 and transmits the information (traffic volume information) of the counted value to the road-to-vehicle communication device 2 of the host vehicle C1 through road-to-vehicle communication.

Figure 3:
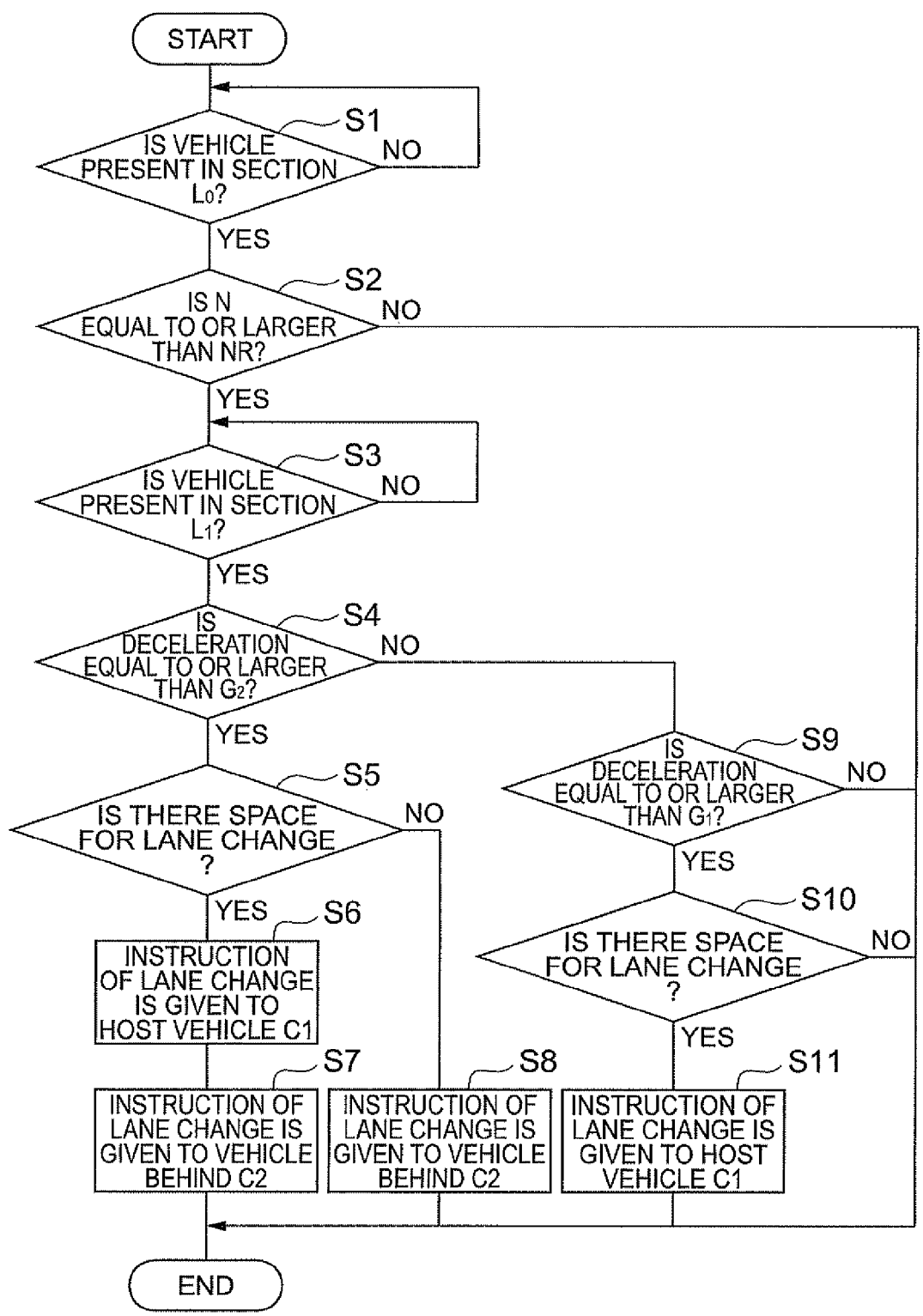
FIG. 3 is a flow chart showing the procedure of processing that the vehicle control device shown in FIG. 1 performs.

FIG. 3 is a flow chart showing the procedure of processing that the vehicle control device 1 performs in this example of use. The procedure of the processing that the vehicle control device 1 performs will be described using FIG. 3. First, the host vehicle C1 measures the position of the host vehicle C1 using a GPS or the like and determines whether or not the host vehicle C1 is present in a section (section $L_0$) from the sagging portion S to the point located $L_0$m before the sagging portion S (step S1). As a result, when it is determined that the host vehicle C1 is present in the section $L_0$, the determination section 3b of the host vehicle C1 determines whether or not the number N of vehicles passing through the point located $L_0$m before the sagging portion S per unit time is equal to or larger than a predetermined value NR (for example, 100 to 300 vehicles/5 minutes) on the basis of the traffic volume information transmitted from the traffic counter T through the road-to-vehicle communication device 2 (step S2).

When the number N of vehicles passing through the point located $L_0$m before the sagging portion S per unit time is equal to or larger than the predetermined value NR as a result of step S2, the position of the host vehicle C1 is measured using a GPS or the like and it is determined whether or not the host vehicle C1 is present in a section (section L1: L1<L0) from the sagging portion S to the point located $L_1$m (for example, about 500 m) before the sagging portion S (step S3). As a result, when it is determined that the host vehicle C1 is present in the section L1, the determination section 3b of the host vehicle C1 determines whether or not the deceleration of a vehicle in front C3 acquired and transmitted by the deceleration acquisition section 3a is equal to or larger than a predetermined value G2 (for example, about 3 m/s$^2$) (step S4).

When it is determined that the deceleration of the vehicle in front C3 is equal to or larger than the predetermined value G2 as a result of step S4, the instruction section 3c of the host vehicle C1 determines whether or not there is a space, which allows the host vehicle C1 to change lane, in the lane R2 (step S5). Here, it may be determined as follows whether or not there is a space allowing the host vehicle C1 to change lane in the lane R2, for example. That is, assuming that the center position of the host vehicle C1 at the time of determination is $X_m$, and the distance by which the host vehicle C1 moves per unit time is $d_1$, the instruction section 3c determines that there is a space allowing the host vehicle C1 to change lane in the lane R2 when there is a space from $X_m$−$d_1$ to $X_m$+2$d_1$+kα in the lane R2. Here, k is a margin coefficient. In addition, α is the amount defined as α=($V_x$−$V_{ys}$)×$T_r$ and indicates a distance by which the host vehicle C1 moves during lane change. $V_x$, $V_{ys}$, and and $T_r$ indicate the speed of the host vehicle C1, a speed limit (for example, 80 km/h) of the lane R2, and a time required for lane change, respectively.

When it is determined that there is a space allowing the host vehicle C1 to change lane in the lane R2 as a result of step S5, the instruction section 3c of the host vehicle C1 instructs the host vehicle C1 to change lane (step S6). In this case, for example, it is possible to instruct a driver to change lane with a voice, an image, and the like, or it is possible to instruct a lane change by generating weak torque in a direction of the lane change to guide the host vehicle C1.

After step S6, the instruction section 3c of the host vehicle C1 instructs a vehicle behind C2 to change lane through the vehicle-to-vehicle communication device 4 (step S7), and the process is ended. In addition, when it is determined that there is no space allowing the host vehicle C1 to change lane in the lane R2 as a result of step S5, the instruction section 3c of the host vehicle C1 instructs the vehicle behind C2 to change lane through the vehicle-to-vehicle communication device 4 (step S8), and the process is ended. Here, the instruction section 3c can instruct a plurality of vehicles behind, in which vehicle-to-vehicle communication devices are mounted, to change lane through the vehicle-to-vehicle communication device 4.

When the number N of vehicles passing through the point located $L_0$m before the sagging portion S per unit time is smaller than the predetermined value NR in the result of step S2, the process is ended since the lane R1 is not in a state where a traffic jam easily occurs (not in a state immediately before a traffic jam).

In addition, when it is determined that the deceleration of the vehicle in front C3 is smaller than the predetermined value G2 in the result of step S4, the determination section 3b of the host vehicle C1 determines whether or not the deceleration of the vehicle in front C3 is equal to or larger than a predetermined value G1 (for example, about 1.5 m/s$^2$) which is smaller than the predetermined value G2 (step S9). As a result, when it is determined that the deceleration of the vehicle in front C3 is equal to or larger than the predetermined value G1, the instruction section 3c of the host vehicle C1 determines whether or not there is a space, which allows the host vehicle C1 to change lane, in the lane R2 (step S10).

When it is determined that there is a space allowing the host vehicle C1 to change lane in the lane R2 as a result of step S10, the instruction section 3c of the host vehicle C1 instructs the host vehicle C1 to change lane (step S11), and the process is ended.

When it is determined that the deceleration of the vehicle in front C3 is smaller than the predetermined value G1 in the result of step S9, it is determined that the deceleration of the vehicle in front C3 does not cause a traffic jam and the process is ended. In addition, also when it is determined that there is no space allowing the host vehicle C1 to change lane in the lane R2 in the result of step S10, the process is ended.

As described above, in the vehicle control device 1 related to the present embodiment, the deceleration of a vehicle in front is acquired in addition to the traffic volume information in a predetermined section (for example, section $L_0$) and a lane change is instructed. In addition, as a result of the host vehicle instructed to change lane executing the lane change, a space for easing the deceleration of a vehicle in front can be created in the lane where the host vehicle is traveling. For this reason, it is possible to suppress the influence of deceleration of a vehicle in front on a vehicle behind. Therefore, the occurrence of a traffic jam can be efficiently suppressed. In addition, the vehicle control device 1 instructs only the host vehicle to change lane when the deceleration of a vehicle in front is relatively small and instructs not only the host vehicle but also a vehicle behind to change lane when the deceleration of a vehicle in front is relatively large. Accordingly, the occurrence of a traffic jam can be suppressed more efficiently. Moreover, in the vehicle control device 1, the determination section 3b can determine whether or not lane change is necessary on the basis of the traveling state information transmitted from traveling state detection section 3d and the information regarding deceleration transmitted from the deceleration acquisition section 3a. For this reason, the vehicle control device 1 can also suppress the occurrence of a traffic jam efficiently on the road where a transmitter which transmits the traffic volume information, such as a traffic counter, is not installed.

In addition, since the vehicle control device 1 instructs lane change on the basis of the deceleration of a vehicle in front, it can be applied to various kinds of road environment, which cause deceleration, without being limited to the sagging portion. For example, the vehicle control device 1 may be applied to various places where deceleration easily occurs, such as a point of change from flatness to an upward slope, a point of change from a steep downward slope to a gentle downward slope, a point of change from a gentle upward slope to a steep upward slope, or a curve.

INDUSTRIAL APPLICABILITY

According to the present invention, it is possible to provide a vehicle control device capable of efficiently suppressing the occurrence of a traffic jam.

The invention claimed is:

1. A vehicle control device comprising:
    traffic volume information acquisition means for acquiring traffic volume information in a predetermined section on a road where a vehicle travels;
    deceleration acquisition means for acquiring deceleration of a preceding vehicle in front of the vehicle in the predetermined section;
    determination means for determining whether or not a lane change is necessary based on the basis of the traffic volume information acquired by the traffic volume information acquisition means and the deceleration acquired by the deceleration acquisition means; and
    instruction means for (i) instructing the vehicle to change lane when the determination means determines that the deceleration is equal to or larger than a first predetermined value and a lane change is necessary and (ii) instructing the vehicle and a second vehicle behind the vehicle to change lane when the determination means determines that the deceleration is equal to or larger than a second predetermined value, which is larger than the first predetermined value, and a lane change is necessary.

2. The vehicle control device according to claim 1, wherein the traffic volume information is a vehicle traffic volume per unit time in the predetermined section, and
    the determination means determines that a lane change is necessary when the vehicle traffic volume per unit time is equal to or larger than a predetermined value.

3. The vehicle control device according to claim 1, wherein when the determination means determines that a lane change is necessary, the instruction means instructs the vehicle to change lane if there is a space for lane change in an adjacent lane.

4. The vehicle control device according to claim 1, wherein when instructing the second vehicle to change lane, the instruction means instructs the second vehicle, in which a vehicle-to-vehicle communication device is mounted, to change lane through vehicle-to-vehicle communication.

5. A vehicle control device comprising:
    a traffic volume information acquisition receiver configured to acquire traffic volume information in a predetermined section on a road where a vehicle travels; and
    an electronic control unit configured to:
        (a) based on information received from an inter-vehicle distance sensor, acquire deceleration of a preceding vehicle in front of the vehicle in the predetermined section,
        (b) determine whether or not a lane change is necessary based on the traffic volume information acquired by the traffic volume information acquisition receiver and the acquired deceleration, and
        (c) (i) instruct the vehicle to change lane when it is determined that the deceleration is equal to or larger than a first predetermined value and a lane change is necessary and (ii) instruct the vehicle and a second vehicle behind the vehicle to change lane when it is determined that the deceleration is equal to or larger than a second predetermined value, which is larger than the first predetermined value, and a lane change is necessary.

6. The vehicle control device according to claim 5, wherein the traffic volume information is a vehicle traffic volume per unit time in the predetermined section, and
    the electronic control unit determines that a lane change is necessary when the vehicle traffic volume per unit time is equal to or larger than a predetermined value.

7. The vehicle control device according to claim 5, wherein when the electronic control unit determines that a lane change is necessary, the electronic control unit instructs the vehicle to change lane if there is a space for lane change in an adjacent lane.

8. The vehicle control device according to claim 5, wherein when instructing the second vehicle to change lane, the electronic control unit instructs the second vehicle, in which a vehicle-to-vehicle communication device is mounted, to change lane through vehicle-to-vehicle communication.

* * * * *